United States Patent
Brouwers et al.

(10) Patent No.: US 9,577,901 B2
(45) Date of Patent: Feb. 21, 2017

(54) METHOD AND ARRANGEMENT FOR SUPPRESSING MESSAGES FROM A MEDICAL SYSTEM

(71) Applicants: Herbert Brouwers, Erlangen (DE); Holger Hundeshagen, Erlangen (DE)

(72) Inventors: Herbert Brouwers, Erlangen (DE); Holger Hundeshagen, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 212 days.

(21) Appl. No.: 14/081,536

(22) Filed: Nov. 15, 2013

(65) Prior Publication Data
US 2014/0143362 A1 May 22, 2014

(30) Foreign Application Priority Data
Nov. 16, 2012 (DE) .......... 10 2012 220 958

(51) Int. Cl.
*G06F 15/16* (2006.01)
*G06F 15/177* (2006.01)
(Continued)

(52) U.S. Cl.
CPC ............. *H04L 43/065* (2013.01); *H04L 51/12* (2013.01); *H04L 51/24* (2013.01)

(58) Field of Classification Search
CPC .... H04L 67/303; H04L 67/306; H04L 43/065; H04L 43/50; H04L 12/2697; H04L 51/12; G06Q 50/22; G06Q 50/184; G06Q 30/02
(Continued)

(56) References Cited

U.S. PATENT DOCUMENTS 8,838,713 B2 9/2014 Moore
2004/0153870 A1 8/2004 Konz et al.
(Continued)

FOREIGN PATENT DOCUMENTS

CN 1901453 A 1/2007
CN 101466161 B 8/2010
(Continued)

OTHER PUBLICATIONS

German Office Action cited in German Application No. 10 2012 220 958.1, mailed Aug. 13, 2013.
(Continued)

*Primary Examiner* — Farzana Huq
(74) *Attorney, Agent, or Firm* — Lempia Summerfield Katz LLC

(57) ABSTRACT

A method for suppressing messages from a medical system in a remote maintenance center during maintenance work includes generating an item of start information that indicates a start of the maintenance work on the medical system. The method also includes transmitting the start information to the remote maintenance center, and generating an item of end information that indicates an end of the maintenance work on the medical system. The method includes transmitting the end information to the remote maintenance center and suppressing the messages that are sent from the medical system to the remote maintenance center in a time between the start information and the end information, in the remote maintenance center.

15 Claims, 2 Drawing Sheets

(51) Int. Cl.
    *G06F 15/173*    (2006.01)
    *H04L 12/26*     (2006.01)
    *H04L 12/58*     (2006.01)

(58) Field of Classification Search
    USPC .......... 709/207, 217, 220, 223, 224; 705/51
    See application file for complete search history.

(56) References Cited

U.S. PATENT DOCUMENTS

| | | |
|---|---|---|
| 2006/0064491 A1 | 3/2006 | Ebert et al. |
| 2007/0297557 A1 | 12/2007 | Kuwatani |
| 2008/0255681 A1 | 10/2008 | Scott et al. |
| 2009/0132586 A1* | 5/2009 | Napora ................ G06F 19/322 |
| 2011/0010087 A1* | 1/2011 | Wons .................... G06F 19/327 |
| | | 701/533 |
| 2012/0246246 A1 | 9/2012 | Moore |
| 2013/0018667 A1* | 1/2013 | Nudd .................... G06Q 50/22 |
| | | 705/2 |
| 2013/0157571 A1* | 6/2013 | Wondka ............ H04W 52/0245 |
| | | 455/41.2 |

FOREIGN PATENT DOCUMENTS

| | | |
|---|---|---|
| CN | 102275806 A | 12/2011 |
| CN | 101582738 B | 9/2012 |
| CN | 102710972 A | 10/2012 |
| DE | 102004045743 | 3/2006 |
| DE | 102008017843 | 11/2008 |

OTHER PUBLICATIONS

Chinese Office Action for related Chinese Application No. 201310565728.4 dated Nov. 1, 2016, with English Translation.

\* cited by examiner

METHOD AND ARRANGEMENT FOR SUPPRESSING MESSAGES FROM A MEDICAL SYSTEM

This application claims the benefit of DE 10 2012 220 958.1, filed on Nov. 16, 2012, which is hereby incorporated by reference in its entirety.

FIELD

The present embodiments relate to a method and an arrangement for suppressing messages from a medical system in a remote maintenance center while maintenance work is being carried out.

BACKGROUND

A software component makes it possible for medical systems (e.g., angiography devices) to independently report system faults or deviations from standard operation to a remote maintenance center or service center.

The published patent application DE 10 2004 045743 A1 describes remote maintenance of imaging devices, for example. Such devices are often maintained, within the scope of a first service level, by the clinic's own service technicians who, in the event of the occurrence of more specific or more complex problems, access the support of the respective manufacturer or specialized service companies within the scope of higher service levels by remote maintenance. A number of potential technical problems may be attributed to causes that may be identified in a relatively simple manner and may accordingly be frequently rectified in a simple manner. Such problems (e.g., main cable not plugged in or printer ink empty) may be solved in situ without special device knowledge. In such cases, consumables may be purchased if necessary. More complex problems may also be identified by unspecialized service technicians in situ, i. In such a case, a test routine is to be executed under certain circumstances. The routine is to be executed in order to exclude possible but irrelevant causes of a problem or to trace back to the actual cause.

The systems therefore enable remote maintenance such that parameter values of particular monitoring parameters provided for this purpose are collected and remotely transmitted by corresponding sensors. In order to directly carry out checks on the device (e.g., the execution of fault search trees), in order to locate a problem, a service technician directly carries out the above-described test measures on the device in situ according to service documentation. In accordance with the service documentation, the service technician processes instructions from the fault search tree and carries out checks. The results of the checks lead to the identification of the cause of a problem through the branches of the search tree.

If such maintenance operations are carried out by service technicians, experience shows that system deviations from standard operation caused by maintenance and thus messages in the remote maintenance center result while the work is being carried out on the medical system. The messages give rise to measures in the remote maintenance center (e.g., making contact with the affected customer, planning further service technician operations). Since several thousand medical systems may be connected to a remote maintenance center, these system messages are disruptive.

SUMMARY

The scope of the present invention is defined solely by the appended claims and is not affected to any degree by the statements within this summary.

The present embodiments may obviate one or more of the drawbacks or limitations in the related art. For example, a method and an associated arrangement that improve the progress of maintenance work on a medical system are provided.

System messages arriving in a remote maintenance center from a medical system are suppressed or ignored as long as maintenance work is being carried out on the medical system.

A method for suppressing messages from a medical system in a remote maintenance center while maintenance work is being carried out is provided. The method includes generating an item of start information that indicates a start of the maintenance work on the medical system, and transmitting the start information to the remote maintenance center. The method also includes generating an item of end information that indicates the end of the maintenance work on the medical system, and transmitting the end information to the remote maintenance center. The method includes suppressing the messages that are sent from the medical system to the remote maintenance center between the start information and the end information, in the remote maintenance center. One or more of the present embodiments afford the advantage that unnecessary actions and measures in a remote maintenance center are avoided.

In one development of the method, the start information and the end information may be triggered by a service technician at the location of the medical system.

In another embodiment, the start information and the end information may be generated using an input unit. In one embodiment, the input unit includes a personal digital assistant.

In one embodiment, the start information and the end information may be transmitted from the location of the medical system to the remote maintenance center.

The start information and the end information may be transmitted to the remote maintenance center by the personal digital assistant.

In one development of the method, no measures that affect the messages are taken as a result of the messages being suppressed.

In another embodiment, the start information may include a first time, and the end information may include a second time.

One or more of the present embodiments also specify an arrangement for suppressing messages. The arrangement includes a medical system that may be used to emit the messages, and a remote maintenance center that may be used to receive the messages from the medical system. The arrangement also includes an input unit in which an item of start information and an item of end information may be generated. The start information indicates the start of maintenance work on the medical system, and the end information indicates the end of the maintenance work. The arrangement also includes a suppression module in the remote maintenance center. The suppression module suppresses incoming messages from the medical system in a time between the start information and the end information.

In one development, the input unit may include a personal digital assistant.

In another embodiment, the suppression module may provide that no measures that affect the messages are taken as a result of the messages being suppressed.

DETAILED DESCRIPTION

Figure 1:
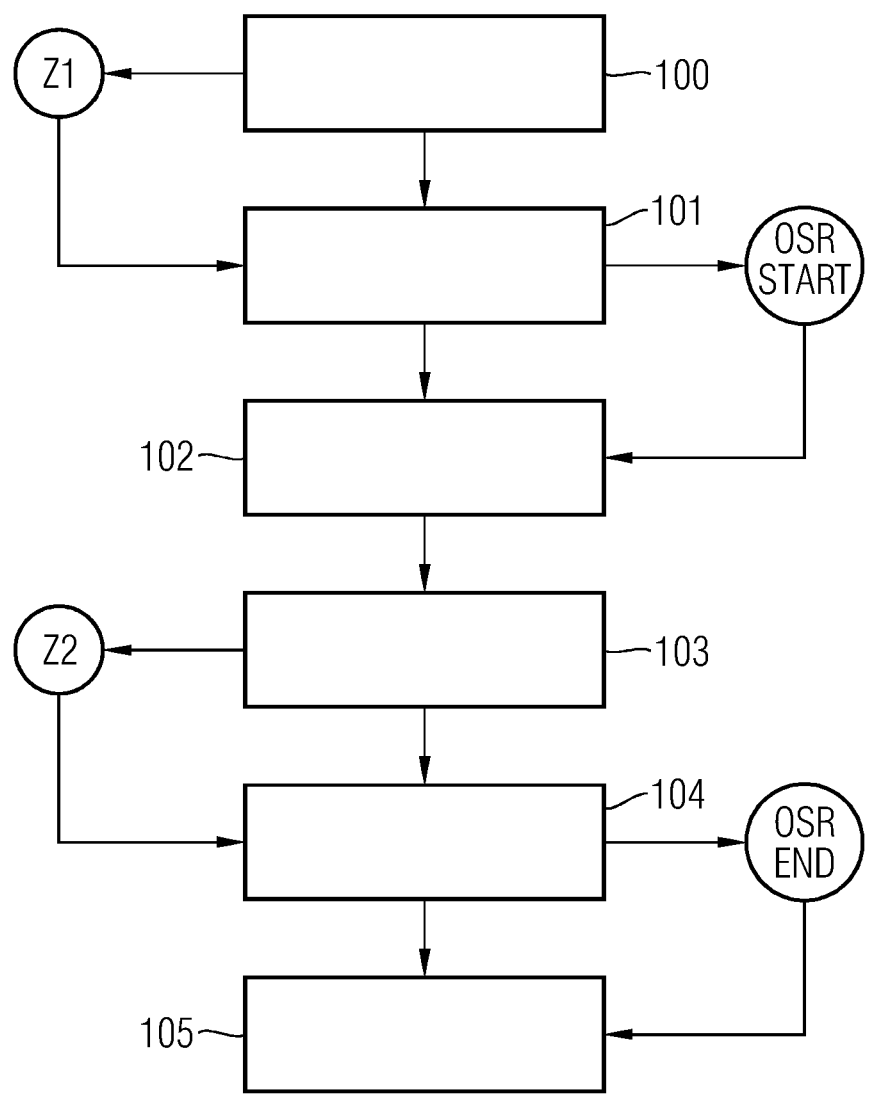
FIG. 1 shows a flowchart of one embodiment of a method for suppressing messages from a medical system in a remote maintenance center during maintenance work.

FIG. 1 shows a flowchart of one embodiment of a method for suppressing messages from a medical system 1 in a remote maintenance center 2. It is disruptive to an operating sequence if messages M in a remote maintenance center 2 trigger actions during maintenance work on the medical system 1 by a service technician. A large number of messages M, such as fault messages and status messages, may be generated and transmitted to the remote maintenance center 2 during maintenance work. In order to preclude this, one or more of the present embodiments provide a simple and reliable solution.

In act 100, the service technician in situ notifies his input unit 5 (e.g., a personal digital assistant (PDA)) that he is starting the maintenance work. The input unit 5 generates an item of start information Z1 that is sent, via a data connection network 3, to the remote maintenance center 2 where an on-site repair start message OSR START is generated in act 101. All messages M that come from the medical system 1 are then suppressed (e.g., are not displayed) in act 102. In addition, the remote maintenance center 2 does not trigger any further measures. In other words, messages M from the medical system 1 are ignored during the maintenance or repair period.

Once the service technician has completed his maintenance or repair work, he inputs the end of the work to his input unit 5 in act 103, and an item of end information Z2 that indicates the end of the maintenance work is generated. The end information Z2 is sent, via the data connection network 3, to the remote maintenance center 2 where an on-site repair end message OSR END is generated in act 104. From this time on, messages M from the medical system 1 are no longer suppressed but rather are displayed and may cause further measures.

Figure 2:
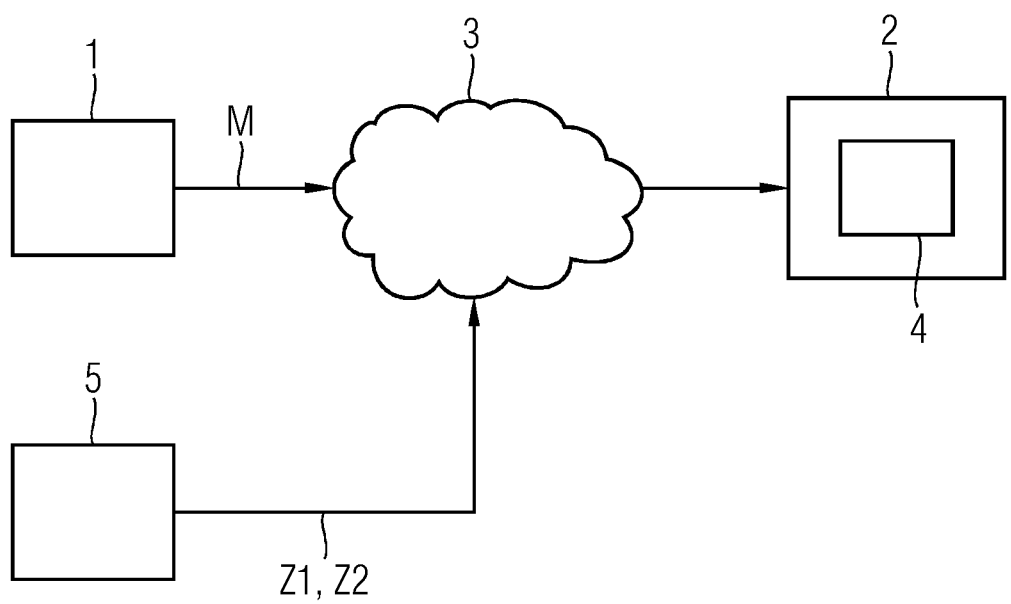
FIG. 2 shows a block diagram of one embodiment of an arrangement for suppressing messages.

FIG. 2 shows a block diagram of one embodiment of an arrangement for suppressing messages M. The arrangement includes a medical system 1 that emits a message M in the event of a fault, for example. The arrangement also includes a remote maintenance center 2 that receives and records the message M emitted by the medical system 1. The start and end of maintenance work in the form of an item of start information Z1 and an item of end information Z2 may be produced using an input unit 5.

The two items of information Z1, Z2 are each transmitted to the remote maintenance center 2. The medical system 1 and the input unit 5 are connected to the remote maintenance center 2 via a data connection network 3. After the start information Z1 has arrived, all messages M from the medical system 1 are suppressed in the remote maintenance center 2 by the suppression module 4 (e.g., the messages M do not have any effect) until the end information Z2 arrives.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for suppressing messages from a medical system in a remote maintenance center during maintenance work, the method comprising:
   Receiving messages, from the medical system, by the remote maintenance center, wherein the messages are indicative of faults occurring at the medical system;
   initiating measures, by the remote maintenance center, based on the received messages;
   receiving start information data, from an input unit, wherein the start information data is indicative of a start of the maintenance work on the medical system;
   generating a start message, at the remote maintenance center, based on the received start information data;
   receiving end information data, from the input unit, wherein the end information data is indicative of an end of the maintenance work on the medical system;
   generating an end message, at the remote maintenance center, based on the received end information data; and
   suppressing messages received by the remote maintenance center sent from the medical system during a time between the start message and the end message in the remote maintenance center, wherein the suppressing includes preventing a display of the suppressed messages in the remote maintenance center,
   wherein the start information data is transmitted from the input unit at a location of the medical system to the remote maintenance center, and
   wherein the end information data is transmitted from the input unit at the location of the medical system to the remote maintenance center.

2. The method of claim 1, wherein the start information data and the end information data are triggered by a service technician at a location of the medical system.

3. The method of claim 1,
   wherein the start information data is generated by the input unit, and
   wherein the end information data is generated by the input unit.

4. The method of claim 1, wherein the input unit comprises a personal digital assistant.

5. The method of claim 1, wherein no measures based on the suppressed messages are taken as a result of the messages being suppressed.

6. The method of claim 1, wherein the start information data comprises a first time, and the end information data comprises a second time.

7. The method of claim 2,
   wherein the start information data is generated by the input unit, and
   wherein the end information data is generated by the input unit.

8. The method of claim 7, wherein the input unit comprises a personal digital assistant.

9. The method of claim 4, wherein the start information data and the end information data are transmitted to the remote maintenance center by the input unit.

10. The method of claim 2, wherein no measures based on the suppressed messages are taken as a result of the messages being suppressed.

11. The method of claim 2, wherein the start information data comprises a first time, and the end information data comprises a second time.

12. A system for suppressing messages, the system comprising:
- a medical system that is useable to emit messages;
- a remote maintenance center that is usable to receive messages from the medical system and initiate measures based on the received messages, the messages indicating a status of the medical system;
- an input unit in which start information data and end information data are generatable, the start information data indicating a start of maintenance work on the medical system, and the end information data indicating an end of the maintenance work; and
- a suppression module in the remote maintenance center, the suppression module being usable to suppress messages received by the remote maintenance center from the medical system in a time between the start of the maintenance work and the end of the maintenance work, wherein suppression of the messages includes prevention of a display of the suppressed messages in the remote maintenance center,
- wherein the start information data is transmittable from the input unit at a location of the medical system to the remote maintenance center, and
- wherein the end information data is transmittable from the input unit at the location of the medical system to the remote maintenance center.

13. The system of claim 12, wherein the input unit comprises a personal digital assistant.

14. The system of claim 12, wherein the suppression module is configured such that no measures based on the suppressed messages are taken as a result of the messages being suppressed.

15. The system of claim 13, wherein the suppression module is configured such that no measures based on the suppressed messages are taken as a result of the messages being suppressed.

* * * * *